(12) United States Patent
Lam et al.

(10) Patent No.: US 11,922,195 B2
(45) Date of Patent: Mar. 5, 2024

(54) EMBEDDABLE NOTEBOOK ACCESS SUPPORT

(71) Applicant: Microsoft Technology Licensing, LLC, Redmond, WA (US)

(72) Inventors: John Francis Lam, Redmond, WA (US); Safia Abdalla, Woodinville, WA (US); Shibani Raj Basava, Seattle, WA (US); Dinesh Chandnani, Sammamish, WA (US); Zhu Chen, Redmond, WA (US); Kwangje Cho, Bellevue, WA (US); Ram Kumar Donthula, Redmond, WA (US); Katherine Kampf, Seattle, WA (US); Daniel Moth, Seattle, WA (US); Andrew Christopher Neil, Seattle, WA (US); Vaishnavi Sannidhanam, Bellevue, WA (US); Barry Manh Tu, Bothell, WA (US); Vijaya Krishna Upadya, Sammamish, WA (US); Dileep Yavanmandha, Kenmore, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 319 days.

(21) Appl. No.: 17/224,992

(22) Filed: Apr. 7, 2021

(65) Prior Publication Data
US 2022/0334857 A1  Oct. 20, 2022

(51) Int. Cl.
*G06F 9/455* (2018.01)
*G06F 9/445* (2018.01)
(Continued)

(52) U.S. Cl.
CPC ...... *G06F 9/45529* (2013.01); *G06F 9/44521* (2013.01); *G06F 9/5077* (2013.01); *G06F 9/543* (2013.01); *G06F 9/545* (2013.01)

(58) Field of Classification Search
CPC ............. G06F 9/45529; G06F 9/44521; G06F 9/5077; G06F 9/543; G06F 9/545
See application file for complete search history.

(56) References Cited

U.S. PATENT DOCUMENTS

| 11,086,891 B2 * | 8/2021 | Marsden ............. G06F 16/2465 |
| 11,308,595 B1 * | 4/2022 | Wheeler ................... G06T 5/50 |

(Continued)

OTHER PUBLICATIONS

"What is the Jupyter Notebook?", retrieved from <<https://nbviewer.jupyter.org/github/jupyter/notebook/blob/master/docs/source/examples/Notebook/What%20is%20the%20Jupyter%20Notebook.ipynb>>, no later than Feb. 24, 2020, 3 pages.

(Continued)

*Primary Examiner* — Azizul Choudhury
(74) *Attorney, Agent, or Firm* — Ogilvie Law Firm

(57) ABSTRACT

Some embodiments support embedding of a notebooks software component in a surrounding host application, thereby promoting consistency of notebook user interfaces and user experiences between different kinds of applications. For instance, the notebook access added to an integrated development environment (IDE) may be aesthetically consistent with the notebook access added to a business analytics tool from the same vendor as the IDE. Departures from the aesthetic are still supported, e.g., a notebook access provided in a video gaming environment to teach gamers programming skills may have the same aesthetic as the simulated world of the video game, rather than an IDE aesthetic or an enterprise software aesthetic. Direct integration or proxied integration architectures may be used. Efficiencies may be gained by distinguishing between notebook viewing, editing, and executing operations, and providing more computationally expensive resources only as needed for the notebook access being performed.

20 Claims, 6 Drawing Sheets

(51) Int. Cl.
*G06F 9/50* (2006.01)
*G06F 9/54* (2006.01)

(56) References Cited

U.S. PATENT DOCUMENTS

| | | | |
|---|---|---|---|
| 2007/0006037 | A1 | 1/2007 | Sargusingh et al. |
| 2010/0235815 | A1 | 9/2010 | Maybee et al. |
| 2011/0258600 | A1 | 10/2011 | Osenkov et al. |
| 2011/0307859 | A1 | 12/2011 | Hagenlocher et al. |
| 2012/0084753 | A1 | 4/2012 | Maybee et al. |
| 2012/0124426 | A1 | 5/2012 | Maybee et al. |
| 2012/0124504 | A1 | 5/2012 | Maybee et al. |
| 2012/0151447 | A1 | 6/2012 | Maybee et al. |
| 2012/0159261 | A1 | 6/2012 | Maybee et al. |
| 2013/0080502 | A1 | 3/2013 | Mccoll et al. |
| 2013/0080506 | A1 | 3/2013 | Ng et al. |
| 2013/0081001 | A1 | 3/2013 | Mccoll et al. |
| 2014/0173359 | A1 | 6/2014 | Basava et al. |
| 2015/0143180 | A1 | 5/2015 | Dawson et al. |
| 2015/0143342 | A1 | 5/2015 | Chandnani et al. |
| 2015/0347274 | A1 | 12/2015 | Taylor et al. |
| 2018/0276104 | A1 | 9/2018 | Calla et al. |
| 2019/0042290 | A1* | 2/2019 | Bailey ............... G06F 9/45558 |
| 2019/0354716 | A1 | 11/2019 | Basava et al. |
| 2019/0354717 | A1 | 11/2019 | Boon et al. |
| 2019/0354718 | A1 | 11/2019 | Chandnani et al. |
| 2020/0019384 | A1 | 1/2020 | Lyu et al. |
| 2020/0050431 | A1 | 2/2020 | Zilouchian Moghaddam et al. |
| 2020/0142725 | A1* | 5/2020 | Resende ............ G06F 9/45558 |
| 2020/0364857 | A1* | 11/2020 | Moen ................. G06V 10/945 |

OTHER PUBLICATIONS

"Benchmarks #1", retrieved from <<https://github.com/rebornix/notebook-test/issues/1#issue-527483193>>, Nov. 22, 2019, 14 pages.

"Notebook output security #3", retrieved from <<https://github.com/rebornix/notebook-test/issues/3>>, Dec. 12, 2019, 8 pages.

"Create a new notebook instance", retrieved from <<https://cloud.google.com/ai-platform/notebooks/docs/create-new>>, Mar. 5, 2020, 6 pages.

"Visual Studio Code", retrieved from <<https://en.wikipedia.org/wiki/Visual_Studio_Code>>, Mar. 3, 2020, 5 pages.

"Nteract: building the future of interactive computing.", retrieved from <<https://nteract.io/>>, no later than Mar. 11, 2020, 5 pages.

"Aws-samples/amazon-forecast-samples", retrieved from <<https://github.com/aws-samples/amazon-forecast-samples>>, Feb. 6, 2020, 6 pages.

"Jupyter", retrieved from <<https://jupyter.org/index.html>>, no later than Jan. 14, 2020, 9 pages.

"The Markdown Guide", retrieved from <<https://www.markdownguide.org/>>, no later than Mar. 2, 2021, 2 pages.

"Microsoft Azure Notebooks", retrieved from <<https://notebooks.azure.com/>>, no later than Mar. 2, 2021, 4 pages.

"Project Jupyter Home", retrieved from <<https://jupyter.org>>, no later than Mar. 2, 2021, 10 pages.

"Project Jupyter", retrieved from <<https://en.wikipedia.org/wiki/Project_Jupyter>>, Feb. 24, 2021, 6 pages.

"Use a Jupyter Notebook with Microsoft offerings", retrieved from <<https://docs.microsoft.com/en-us/azure/notebooks/quickstart-export-jupyter-notebook-project>>, Feb. 1, 2021, 6 pages.

Emil Lamprecht, "The Difference Between UX And UI Design—A Beginner's Guide", retrieved from <<https://careerfoundry.com/en/blog/ux-design/the-difference-between-ux-and-ui-design-a-laymans-guide/>>, Mar. 11, 2021, 23 pages.

"ActiveX", retrieved from <<https://en.wikipedia.org/wiki/ActiveX>>, Mar. 12, 2021, 5 pages.

"Object Linking and Embedding", retrieved from <<https://en.wikipedia.org/wiki/Object_Linking_and_Embedding>>, Oct. 14, 2020, 8 pages.

* cited by examiner

| SOME EXAMPLES OF HOST APPLICATIONS 208 |
|---|
| INTEGRATED DEVELOPMENT ENVIRONMENT (IDE) 702 |
| CLOUD 704 HOSTED REPOSITORY ENVIRONMENT 706 |
| MACHINE LEARNING PLATFORM 708 |
| VIDEO GAMING 714 ENVIRONMENT 712 |
| EDUCATIONAL CLOUD COMPUTING LABORATORY 710 |

Fig. 7

| SOME ASPECTS 800 OF SOME EMBODIMENTS | | | |
|---|---|---|---|
| COMPONENT REFERENCE 802 | | MESSAGING PROTOCOL 804 | |
| AUTOCOMPLETION 814 | CELL 818 | FRAME 820 | DOMAIN 816 |
| NOTEBOOK CONTENT 828 | HUB 840 | POINTER 834 | FORMAT 830 |
| CONVERSION SERVICE 838 | HOOK 824 | CALLBACK 826 | EDITOR 832 |
| EVENT-DRIVEN API 822 | MESSAGE-PASSING 806 | | BROKERING 810 |
| TUNNELING 808 | PROXYING 812 | NOTEBOOK RESOURCE 836 | |

Fig. 8

EMBEDDABLE NOTEBOOK ACCESS SUPPORT

BACKGROUND

Noon With the ongoing development of computer software, many different kinds of digital documents have become available for use in various ways. Plain text prose, formatted text prose, formatted or plain text computer source code, and markup/markdown language text are each widely used, and each can be edited using various software tools. Images are also presented to human viewers in various digital documents, and in some cases the images can also be edited by the viewer. Text and images may be combined in a single document, by using a suitable word processor, or computer-aided design software, or graphics editing software, for example.

"Notebook documents" (sometimes called "notebooks") are recent additions to this landscape of documents. A notebook may include both prose text and computer code, e.g., a script written in a script programming language. Executing the script of a notebook may produce a graph or other image that is also part of the notebook. Editing the script will result in a corresponding update to the image generated by the script. Some notebooks can be edited, executed, and presented in a web browser, by using a client-server software application specifically designed for such notebooks.

However, advances in technology for supporting access to notebook documents would be beneficial.

SUMMARY

To reduce or avoid inconsistencies in notebook user interfaces and notebook user experiences, some embodiments taught herein provide an embeddable and efficient notebook access technology. The notebook access technology is easily installed in a wide variety of surrounding host applications.

For example, a notebook user interface and user experience provided in an integrated development environment (IDE) can be consistent with the notebook user interface and user experience provided in a video gaming environment, or on a machine learning platform, or in a collaboration tool, or in some other application that hosts notebook access. This consistency across applications may be achieved by embedding copies of the same notebook software component in each host application.

Some embodiments use or provide a hardware and software combination which is configured for notebook operations. The combination includes a digital memory, and a processor which is in operable communication with the memory. The processor is configured, e.g., by tailored software, to perform embedded notebook utilization steps, which include (a) communicating digitally between a notebook front end and a notebook back end, the notebook front end including script which upon execution provides a user interface which performs at least notebook viewing and notebook editing operations, the notebook back end including microservice code, and (b) providing a notebook user interface embedded within a surrounding host application.

Some embodiments provide or use a method for supporting notebook usage, including receiving a reference to a notebook software component, and embedding the reference in a surrounding host application on a host machine.

Some embodiments provide or use a computer-readable storage medium configured with data and instructions which upon execution by a processor cause a cloud computing system to perform a method for supporting notebook usage. The method includes obtaining a pointer to a notebook file which specifies a notebook, creating a notebook resource on a host machine, and connecting the notebook resource to the notebook.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 7 is a block diagram illustrating some examples of applications that may host notebook access;

FIG. 8 is a block diagram illustrating some additional aspects of hosted notebook access;

DETAILED DESCRIPTION

Overview

Innovations may expand beyond their origins, but understanding an innovation's origins can help one more fully appreciate the innovation. In the present case, some teachings described herein were motivated by technical challenges faced by Microsoft innovators who were working to offer a consistent notebook experience across most if not all Microsoft products and services, without sacrificing differentiation as a design option. Notebooks may currently or hereafter be considered useful in a wide variety of applications, including integrated development environments (IDEs) like the Microsoft Visual Studio® and VSCode™ tools (marks of Microsoft Corporation), Minecraft® and other video gaming environments (mark of Mojang Synergies AB Corporation), Azure® Machine Learning and other machine learning platforms, Azure® Synapse and other analytics tools (mark of Microsoft Corporation), GitHub® and other repository environments (mark of GitHub, Inc.), spreadsheet tools, computing laboratory environments, database tools, and many other software offerings. Within Minecraft® environments, for example, notebooks may be used to teach kids how to program using Python and a Minecraft® virtual world, using a notebook component look and feel that matches the Minecraft® aesthetic.

In particular, a technical challenge was to how to provide the option of near or complete consistency between notebook user interfaces and user experiences in a notebook editor, without removing the possibility of planned differences therein. In some embodiments, the look and the feel of the notebook is consistent, yet may also be customizable. In this context, a notebook editor is an interactive computational environment for creating and manipulating notebook documents. The notebook documents used by the innovators as examples are JSON documents that contain an ordered list of input/output cells which can contain source code, structured text (e.g., markdown), plots, and rich media such as HTML and JavaScript®-based interactive graphs (mark of Oracle America, Inc.).

Another technical challenge was to how to efficiently provide services that are used by some notebook users, but not necessarily all users, at some but not necessarily all times. For example, a user may open a notebook merely for reading, or to also edit notebook text. A user may sometimes draw on notebook computational services, e.g., to run scripts.

Other technical challenges are also addressed by teachings herein. The foregoing examples and scenarios are not comprehensive. As will be readily apparent, e.g., by considering FIGS. 2-11 and other information of the present disclosure, the teachings herein describe a variety of notebook access technologies for system integrators or developers to choose from.

Operating Environments

Figure 1:
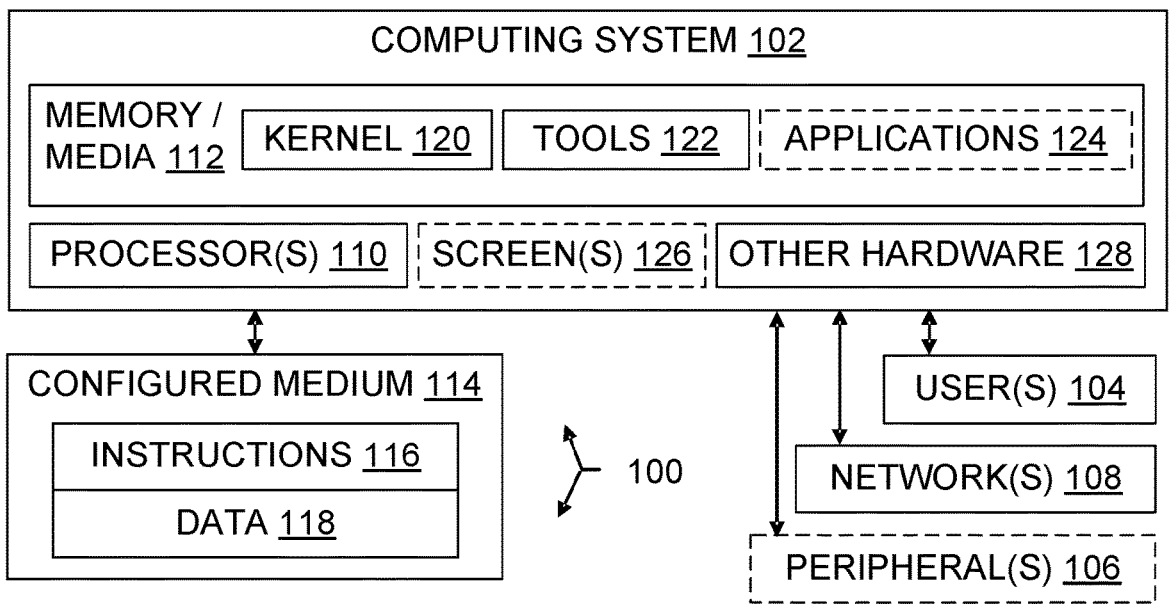
FIG. 1 is a block diagram illustrating computer systems generally and also illustrating configured storage media generally.

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine 604, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, notebook access functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
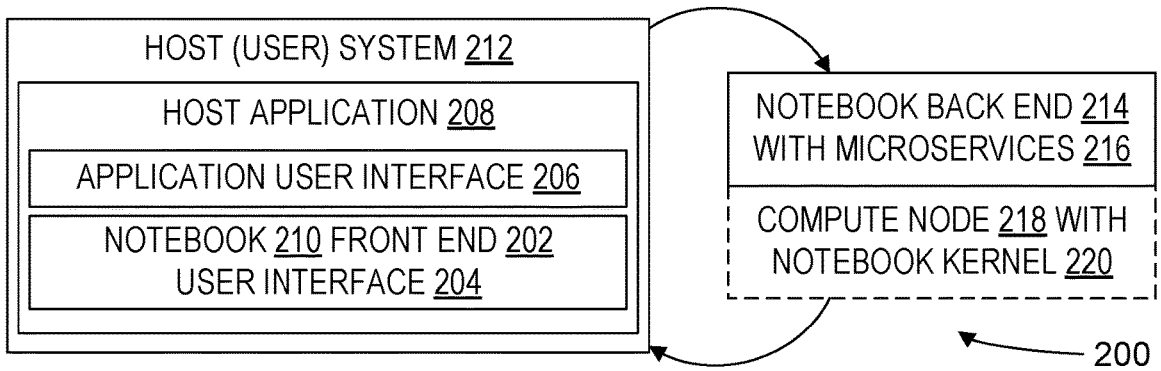
FIG. 2 is a block diagram illustrating aspects of a computing environment which includes notebook access hosted in a host application and serviced by a remote back end.

FIG. 2 illustrates a result after a computing environment 100 has been configured by one or more of the notebook access enhancements taught herein. In this example, the notebook access enhancements include a notebook front end 202 with a user interface 204 embedded in or alongside an application user interface 206 of an application 124 that accordingly is a host application 208, in that it hosts access to one or more notebooks 210 via the notebook user interface 204. The host application user interface 206 and the notebook user interface 204 run on (and thus interface 204 enhances) a host system 212.

The host system 212 communicates, e.g., over a network, with a notebook back end 214 that runs one or more microservices 216. The microservices 216 may be tailored to the host application, e.g., to provide autocompletion of source code within a notebook that is hosted in an integrated development environment, or to provide natural language translation services for translating notebook text. Execution (or interpretation, which may be treated as a form of execution) of notebook script or source code content may be done by a microservice 216. Code execution and other computationally demanding microservices may be performed on a compute node 218, e.g., one or more virtual machines 604, with the support of a notebook kernel 220.

Figure 3:
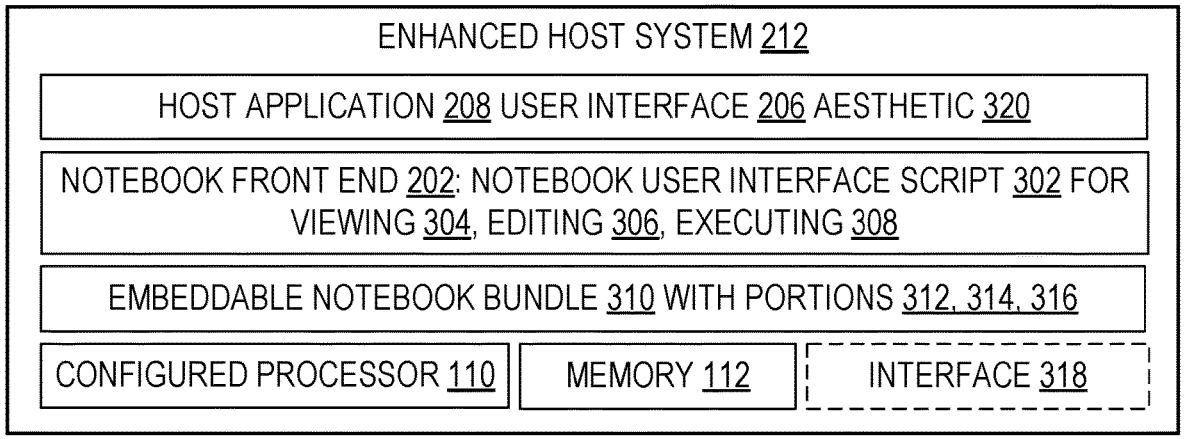
FIG. 3 is a block diagram illustrating aspects of a computing system which is enhanced according to one or more notebook access support approaches taught herein.

FIG. 3 builds on FIG. 2. More generally, as an illustration of any particular part of the discussion herein, one or more Figures may be considered individually, or viewed together as a proper subset, or all Figures may be viewed as a whole, according to the subject matter being discussed. FIG. 3 illustrates an enhanced system 212 which is configured to support hosted notebook access, that is, access to one or more notebooks 210 in which the access is hosted within a host application 208. Within a hosting spreadsheet application for example, a user may read or otherwise access a notebook without exiting the spreadsheet application. The illustrated notebook front end 202 includes a user interface script 302 which upon execution performs operations for a user to view 304, edit 306, or execute 308 notebook content.

The notebook front end 202 is installed in the enhanced system 212 by steps which include embedding a notebook component bundle 310 in the system 212. Embedding generally includes copying the bundle 310 to the system's memory 112 and then initializing the bundle's connection(s) to the notebook back end 214. The bundle may be embedded by value (e.g., on enhanced systems with low network connectivity), or the bundle may be embedded by reference (for downloading on demand, and possibly with caching on the enhanced system). Embedding by reference facilitates centralized updates to the notebook component for changes to feature sets, bug fixes, or security upgrades. The illustrated notebook bundle includes three portions: a notebook user experience structure portion 312, a notebook user experience appearance portion 314, and a notebook user experience behavior portion 316.

The enhanced system 212 may be networked through an interface 318. An interface 318 may include hardware such as network interface cards, software such as network stacks, APIs, or sockets, combination items such as network connections, or a combination thereof.

Figure 4:
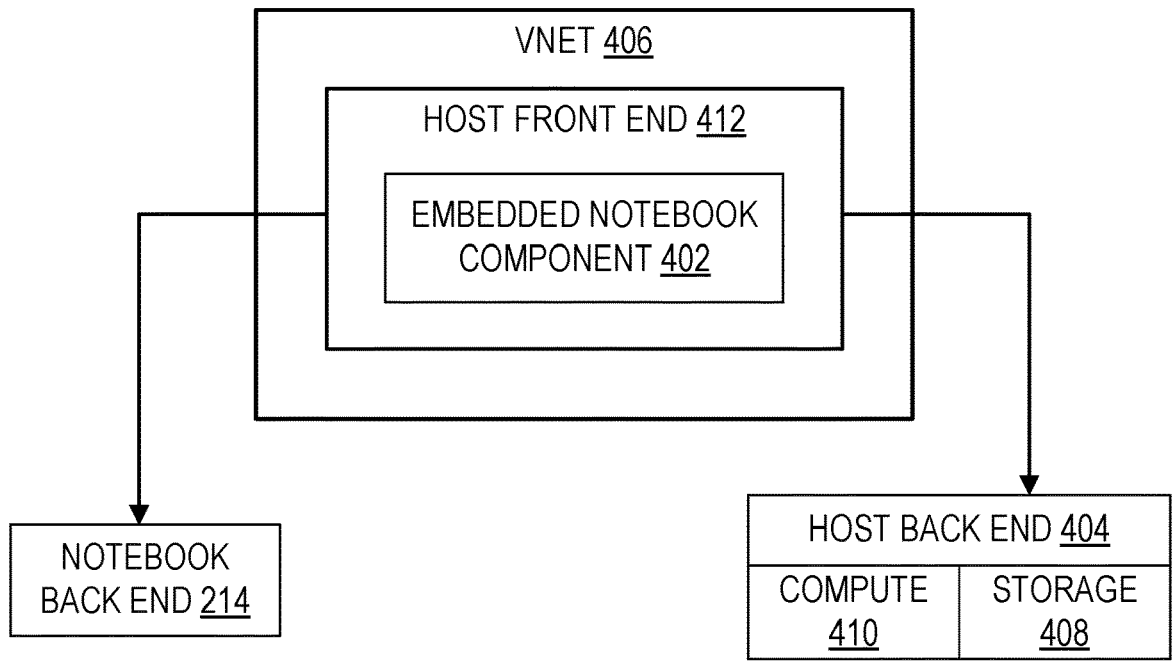
FIG. 4 is a block diagram illustrating a direct integration architecture for notebook access.
Figure 5:
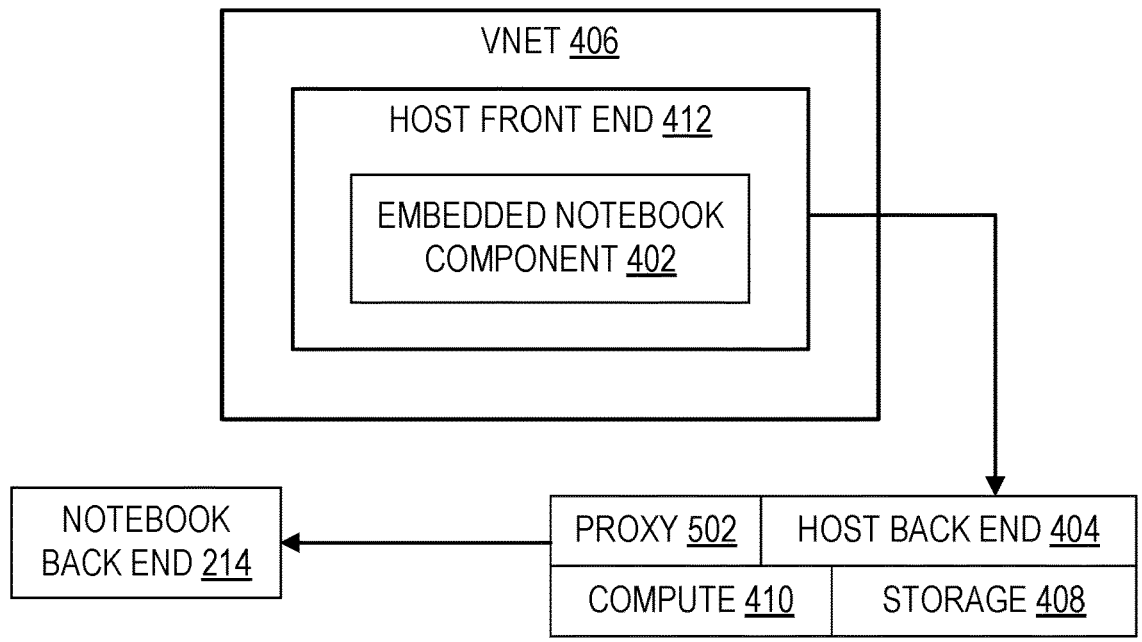
FIG. 5 is a block diagram illustrating a proxied integration architecture for notebook access.
Figure 6:
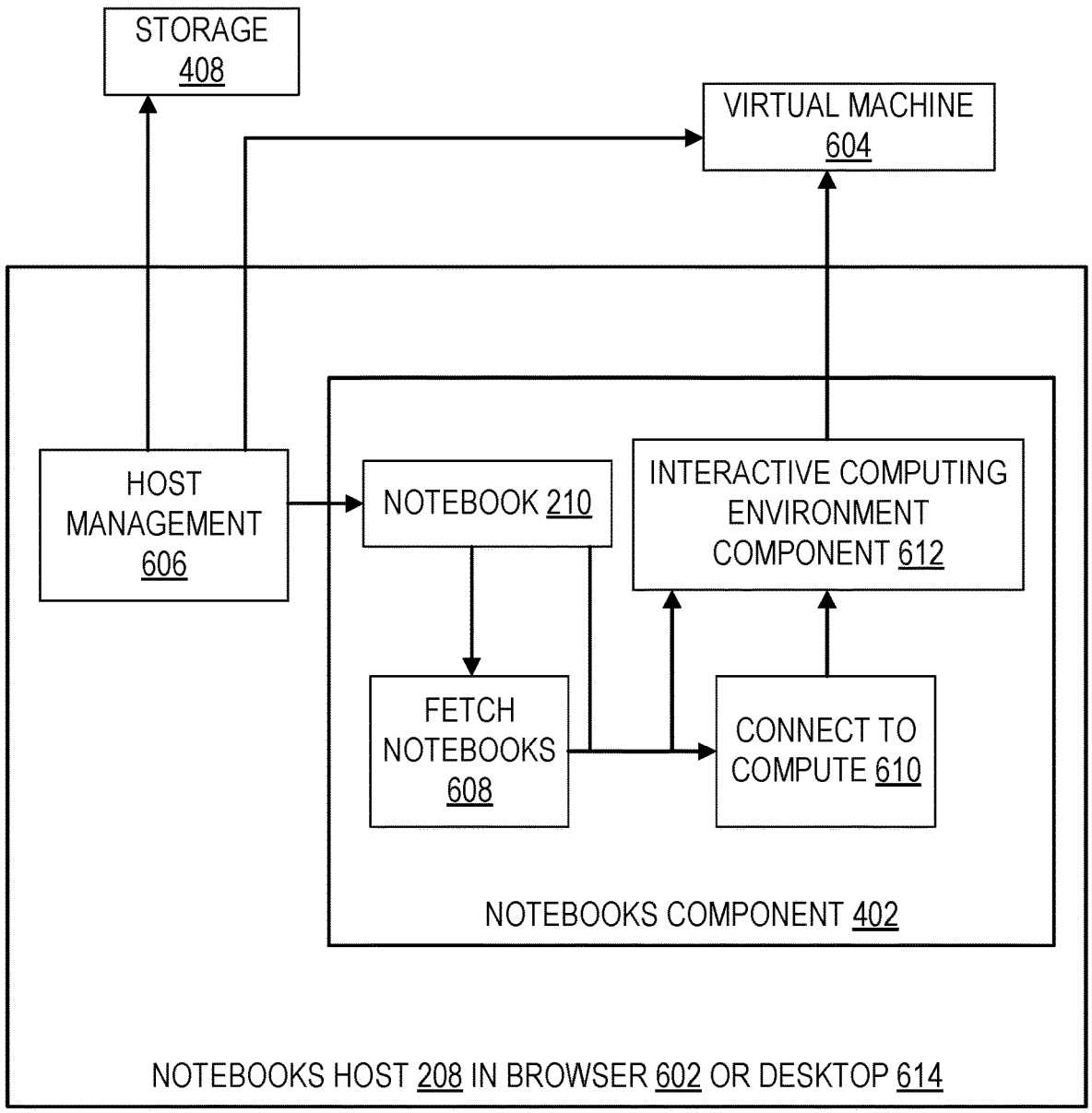
FIG. 6 is a block diagram illustrating another example notebook access architecture.

FIGS. 4 through 6 show some examples of environment 200 architectures. These architectures are discussed at various points herein, including within a section titled "Additional Examples and Observations". Additional details regarding them are also provided in a section titled "List of Reference Numerals".

FIG. 7 shows some examples of host applications 208. This is a set of examples only; it is not a comprehensive list. These items and other host applications 208 are discussed at various points herein, and additional details regarding them are provided in the discussion of a List of Reference Numerals.

FIG. 8 shows some additional aspects 800 of notebook access. These are merely examples; it is not a comprehensive list. These items and other aspects of notebook access are discussed at various points herein, and additional details regarding them are provided in the discussion of a List of Reference Numerals.

Some embodiments use or provide a functionality-enhanced system 200, such as system 212 or another system 102 that is enhanced as taught herein. In some embodiments, an enhanced system which is configured for notebook operations includes a digital memory 112, and a processor 110 in operable communication with the memory. As noted elsewhere herein, digital memory 112 may be volatile or nonvolatile or a mix. The processor 110 is configured to perform embedded notebook utilization steps. The steps include (a) communicating 902 digitally between a notebook front end 202 and a notebook back end 214, the notebook front end including script 302 which upon execution provides a user interface 204 which performs at least notebook viewing 304 and notebook editing 306 operations, the notebook back end including microservice code 216, and (b) providing 904 a notebook user interface 204 embedded 1006 within a surrounding host application 208.

The host application 208 may be viewed as surrounding the notebook, in that experientially, the notebook is like a small rectangle hosted within the surrounding host application big rectangle, which also contains the host application's user interface. The term "rectangle" is not necessarily literal; the notebook user interface may be in a graphical area of any convenient shape.

In some embodiments, the system 200 is further characterized by having one of the following integration architectures: a direct connection architecture 400 wherein the notebook front end 202 calls the notebook back end 214 directly, or a proxy architecture 500 wherein the notebook front end 202 calls a proxy 502 which in turn calls the notebook back end 214.

Some embodiments include an embeddable notebook bundle 310. In some, the embeddable bundle 310 includes an HTML portion 312 which defines at least a notebook user experience structure, a cascading style sheets (CSS) portion 314 which defines at least a notebook user experience appearance, and a JavaScript® or ECMA script portion 316 which defines at least a notebook user experience behavior (mark of Oracle America, Inc.).

A distinction may be made between a user experience (UX) and a user interface (UI), although the UX occurs through use of the UI. In general, UX design addresses user experience of a product, with a focus on pain points users may encounter in their usage of the product, with an emphasis on product effectiveness. UI design addresses product appearance, e.g., typography, visual clutter or clarity, color palettes, buttons, audible feedback, etc. UI emphasizes product aesthetics. However, UI and UX are closely related, and often interact. For present purposes, specific limitations on UX should be understand to occur when UX or UI is limited in the specified manner.

In some embodiments, the system 200 is configured to perform notebook execution operations 308. In some of these, the system includes a compute node 218 in operable communication with the notebook back end 214. In some, the system includes a notebook kernel 220 executing on the compute node 218 or configured for execution on the compute node 218.

In some embodiments, the notebook back end microservice code 216 includes autocompletion code, e.g., code with autocompletion functionality like that provided in Microsoft IDEs.

In some embodiments, the surrounding host application 208 includes at least one of the following: an integrated development environment 702, a cloud 704 hosted repository environment 706, a machine learning platform 708, an educational cloud computing laboratory 710, or a video gaming environment 712. More generally, any application 124 is potentially a host application 208.

Other system embodiments are also described herein, either directly or derivable as system versions of described processes or configured media, duly informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, mechanisms, components, operational sequences, data structures, protocols, or other functionalities for instance, and may otherwise depart from the examples provided herein.

Processes (a.k.a. Methods)

Figure 9:
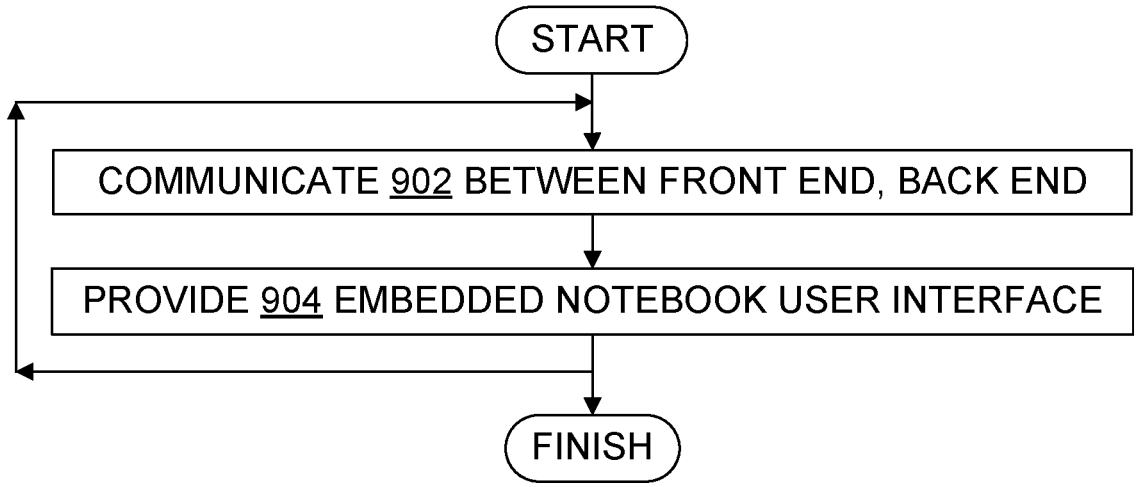
FIG. 9 is a flowchart illustrating steps in some methods for embedded notebook utilization, which is an aspect of notebook access.
Figure 10:
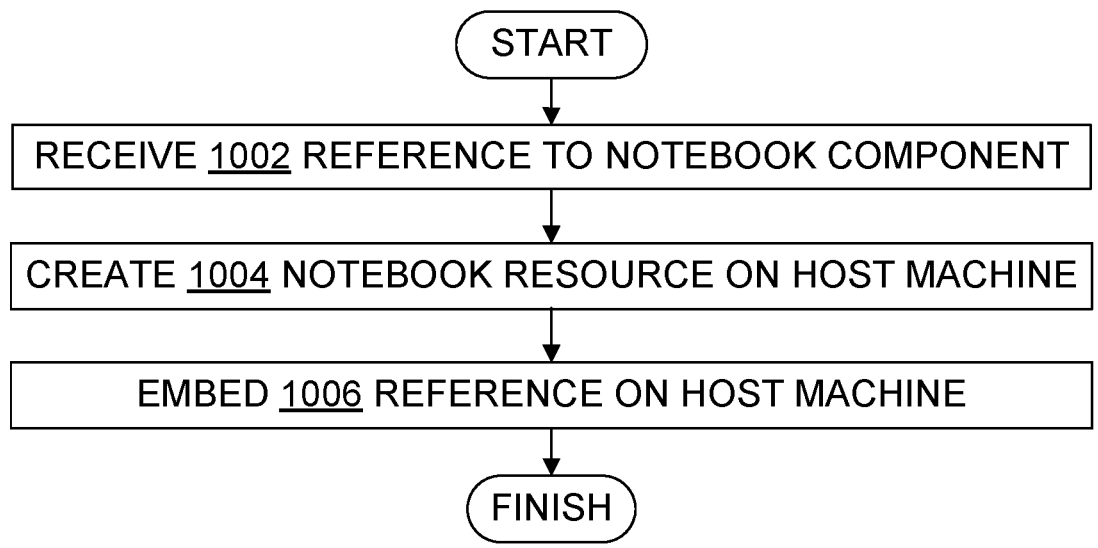
FIG. 10 is a flowchart illustrating steps in some methods for notebook usage support, which is an aspect of notebook access.
Figure 11:
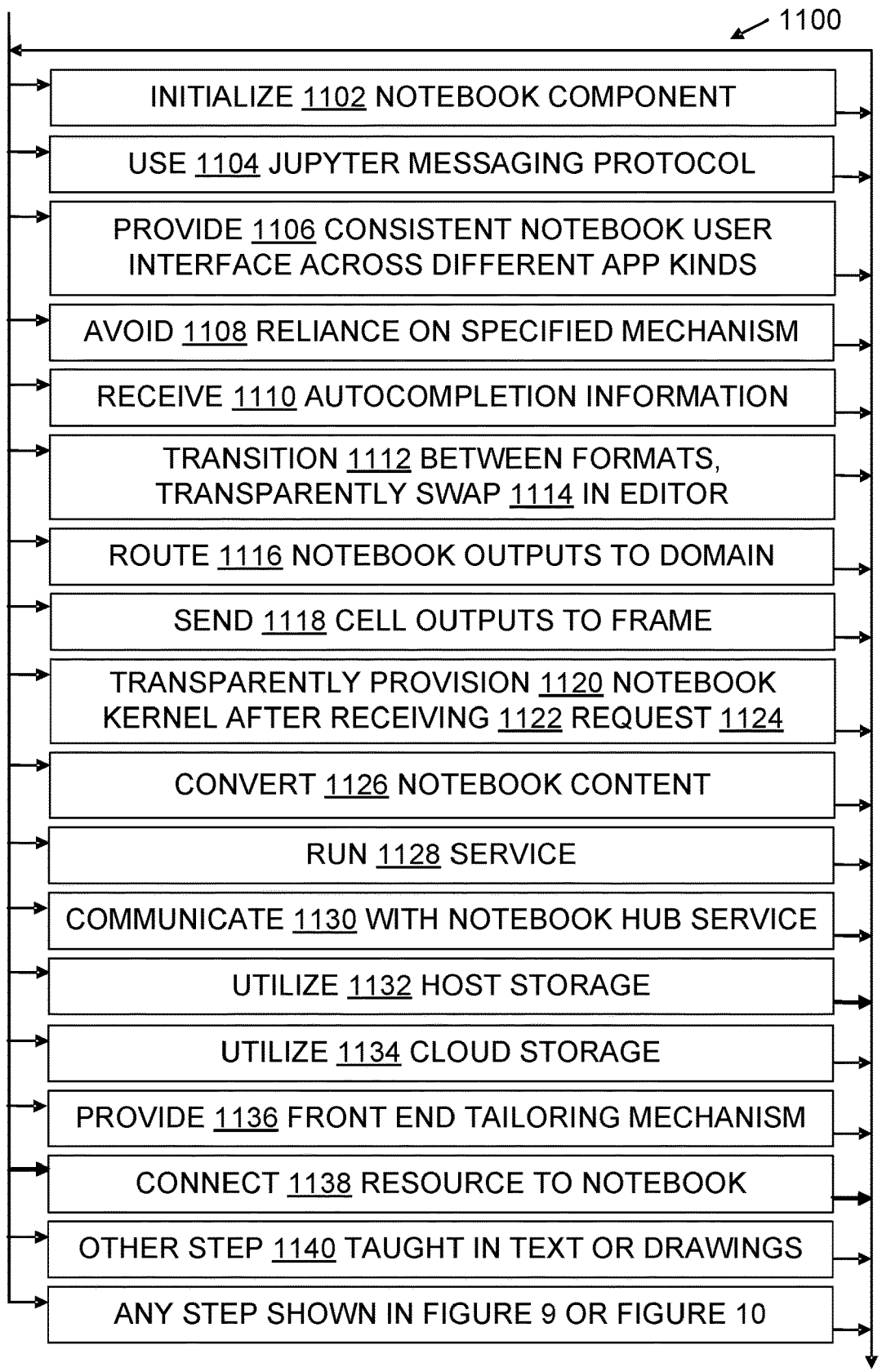
FIG. 11 is a flowchart further illustrating steps in some methods for hosted notebook access.

FIGS. 9 and 10 each illustrate a family of methods 900, 1000 that may be performed or assisted by an enhanced system, such as system 200 or another notebook access functionality enhanced system as taught herein. FIG. 11 further illustrates notebook access methods (which may also be referred to as "processes" in the legal sense of that word) that are suitable for use during operation of a system which has innovative functionality taught herein. FIG. 11 includes some refinements, supplements, or contextual actions for steps shown in FIGS. 9 and 10. FIG. 11 also incorporates steps shown in FIG. 9 or 10.

Technical processes shown in the Figures or otherwise disclosed will be performed automatically, e.g., by an enhanced system 212, unless otherwise indicated. Related processes may also be performed in part automatically and in part manually to the extent action by a human administrator or other human person is implicated, e.g., in some embodiments a human notebook user may manually type text into a notebook. But no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 9 through 11. Steps may be performed serially, in a partially overlapping manner, or fully in parallel. In particular, the order in which flowchart 900, 1000, or 1100 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method for supporting notebook usage, including the following steps: receiving 1002 a reference 802 to a notebook software component 402, and embedding 1006 the reference in a surrounding host application 208 on a host machine.

In some embodiments, the method further includes embedding 1006 the reference 802 (i.e., a copy thereof) in each of at least three kinds of surrounding host application 208, thereby providing 1106 a consistent notebook user interface across different kinds of host application, where the kinds of host application 208 are selected from one or more of the following: integrated development environment applications 702, repository environment applications 706, machine learning platforms 708, educational cloud computing laboratories 710, or video gaming environments 712.

Some of these embodiments are further characterized in that an embedded notebook XN has a user interface XNUI that is aesthetically consistent with a respective surrounding host application user interface XHAUI, and an embedded notebook YN has a user interface YNUI that is not aesthetically consistent with a respective surrounding host application user interface YHAUI. The designations XN, XNUI, XHAUI, YN, YNUI, YHAUI do not denote any particular program or service, but are instead meant to apply generally while still indicating that two different host applications are being discussed.

Two user interfaces are aesthetically consistent when they are aesthetically consistent based on at least one of the following: visual elements, shared graphic libraries, or user perception. Two user interfaces are considered aesthetically consistent based on visual elements when a person of skill considers the user interfaces to be the same in at least four of the following ways: color, shape, pattern, line, texture, visual weight, balance, scale, proximity, and movement. Two user interfaces are considered aesthetically consistent based on shared graphic libraries when they use the same graphic library(ies) or fonts as one another for at least three of the following: drawing menus, drawing windows, drawing cursors or pointers, drawing control widgets, highlighting a selected item in a display, drawing icons. Two user interfaces are considered aesthetically consistent based on user perception when at least two thirds of at least one hundred surveyed users hold the view that the two user interfaces appear to be either identical or very similar. User interfaces that are aesthetically consistent may be described as having the same aesthetic 320. Two user interfaces are considered aesthetically consistent based on gesture consistency when the same user interface gestures accomplish the same tasks in the two user interfaces.

In some embodiments, the method includes initializing 1102 a notebook software component 402 by providing a pointer 834 to the notebook 210 to be rendered (i.e., to be displayed in the user interface 204). In some embodiments, a minimal initialization is providing a pointer to the notebook to be rendered. Compute is optional unless notebook content is on the compute itself. Otherwise it can be provided later for execution of the cells.

In some embodiments, the method includes communicating 1104 under a Jupyter messaging protocol 804 between a notebook kernel 220 and a user interface 204 of a notebook that is identified in the notebook software component 402.

In some embodiments, the method avoids 1108 relying on any of the following for transmitting or securing communications between a host machine web browser 602 and a notebook kernel 220: message passing 806, tunneling 808, brokering 810, or proxying 812. Subsets of this list are avoided in other embodiments, e.g., proxying 812 may be used while message passing 806 is avoided.

In some embodiments, the method includes receiving 1110 autocompletion information 814 at the host machine 212 via the notebook software component 402.

In some embodiments, the method includes routing 1116 notebook outputs to a top-level domain 816 other than a domain that is being used by the surrounding host application. In some embodiments, the method includes sending 1118 outputs of all cells 818 of a notebook 210 to a frame 820. Such routing 1116 and such sending 1118 may be combined, for even greater security.

In some embodiments, the method includes providing 1136 at least one of the following tailoring mechanisms for interaction with user interface of a notebook that is identified in the notebook software component: an event-driven API 822, a hook 824, or a callback 826.

In some embodiments, the method includes transitioning 1112 a notebook content 828 from an HTML format 830 to an editable text format 830 and transparently swapping in 1114 an editor 832 in response to receiving 1122 a user request 1124 to edit 306 the notebook content. In some embodiments, the method includes transparently provisioning 1120 a notebook kernel 220 in response to receiving 1122 a user request 1124 to execute 308 the notebook content. In some, transitioning 1112, swapping 1114, and provisioning 1120 each occur. In one scenario view is initially in HTML, then edit is added when user starts to edit, then compute is added when user says to execute.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media devices (which are not mere propagated signals). The storage device which is configured may be in particular a removable storage medium 114 such as a CD, DVD, or flash memory. A general-purpose memory, which may be removable or not, and may be volatile or not, can be configured into an embodiment using items such as an embeddable notebook bundle 310, notebook script 302, notebook front end 202, notebook back end 214, or notebook component 402, in the form of data 118 and instructions 116, read from a removable storage medium 114 and/or another source such as a network connection, to form a configured storage medium. The configured storage medium 112 is capable of causing a computer system 102 to perform technical process steps for notebook access, as disclosed herein. The Figures thus help illustrate configured storage media embodiments and process (a.k.a. method) embodiments, as well as system and process embodiments. In particular, any of the process steps illustrated in FIGS. 9 through 11, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a cloud computing system to perform a method for supporting notebook usage. This method includes obtaining 1002 a pointer 834 to a notebook file which specifies a notebook 210, creating 1004 a notebook resource 836 on a host machine, and connecting 1138 the notebook resource to the notebook.

In some embodiments, the method further includes performing at least one of the following via a notebook back end service 216: converting 1126 a notebook content between at least two of the following: an HTML format, a PDF format, a LaTeX format, or an executable script format; or running 1128 a Python format conversion service 838 on the notebook content.

In some embodiments, the method further includes communicating 1130 with a multi-user notebook hub service 840 to spawn, proxy, or otherwise manage multiple instances of a single-user notebook server.

In some embodiments, the method further includes at least one of the following: utilizing 1132 a host machine storage device for holding a notebook content during execution of the notebook content while avoiding use of cloud storage of the notebook content, or utilizing 1134 cloud storage of the notebook content during execution of the notebook content. Some embodiments allow loading the content from the compute file system where the notebooks content could be, or allow notebook content to be downloaded and saved to a file cloud storage via APIs.

Observations About Jupyter® Notebooks

Jupyter® notebooks utilize a popular file format across industries such as education, data science, data engineering, and more (mark of NumFOCUS, Inc.). Creating a unique experience for viewing, running, and editing these files has become a common and costly issue, lacking in centralized investment. Teams across Microsoft, as well as products across the industry, have all aimed to create such an experience and faced the challenges of solving the same set of implementation problems, but in different ways, for each of their independent notebooks experiences.

An Azure® notebooks component may solve this issue by providing an embeddable, easy-to-use notebooks experience with a variety of features and an extensible interface. Such a notebooks component may enable multiple public facing products to easily offer a consistent yet differentiated (as desired) notebooks experience across a varied collection of products and services.

In particular, a notebooks canvas may provide a way to view, edit, and run Jupyter® notebooks. Jupyter® notebooks provide an interactive interface to combine markdown text, images, and other textual or non-textual content alongside executable code and visualizations. An Azure® notebooks component may build on top of the Jupyter® project as well as an Nteract™ experience for notebooks (nteract is an applied for mark of Naranga, LLC, listed as abandoned in United States Patent and Trademark Office records as of the present writing).

One such component includes a JavaScript® bundle to be shipped via a content delivery network (CDN) (mark of Oracle America, Inc.). Partners can embed this bundle into their experience to render notebooks with the notebooks component by providing a pointer a notebook file. To add the ability to run a notebook, partners can provide a compute target 410 to execute any code contained in the notebook.

Existing notebooks offerings often utilize the Jupyter® stack which adds additional complexity and requirements to enable notebooks. For example, those deploying a notebook solution may draw upon deep knowledge of the kernel logic when using Jupyter® and Nteract™ technologies inside of their offerings. In comparison, an Azure® notebooks component (and counterpart components per teachings herein) abstracts this kernel logic and reduces complexity for product partners.

As well, compute 410 and storage 408 are required for viewing and editing of notebooks in the existing landscape. Azure® notebooks abstracts away the details of interacting with compute and kernels for viewing and editing of a notebook, providing simplicity and cost reduction to hosts or vendor partners. The notebook component further provides flexibility with its ability to utilize a variety of storage offerings, provided that a pointer to a notebook file (.ipynb) is supplied.

Solutions not guided by teachings herein may not be embeddable out-of-the-box and may require extra effort to be used inside of an existing product or solution. The notebooks component 402 provides a simple way to embed the notebook viewing, editing, and running capabilities in a variety of products. This would allow an authorized vendor to offer a consistent notebook experience across their cloud offerings as well. Additionally, an authorized vendor may use a similar approach to simplify interactions with compute and storage when embedding the notebook component.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

One suitable implementation environment for at least some of the teachings provided herein is a Microsoft Azure® cloud environment 100, enhanced by an Azure® notebooks component 402 as a global service which is available to be hosted by a product 208 running in any Azure® region, even though the Azure® notebooks service might not have a copy (e.g., an Azure® stamp) physically present in every region (mark of Microsoft Corporation). This notebooks service may be architected with an Azure Cosmos DB® database and multi-region deployments to maintain great performance, high availability, and resiliency (mark of Microsoft Corporation). The Azure® notebooks component may leverage the storage 408 of the host product 208 so that notebooks 210 and other files can be consumed and managed together. Not storing customer content enables Azure® notebooks to be offered as a globally scoped service in each Azure® cloud. As a global service the Azure® notebooks component 402 can be hosted by any global, geographic, or regionally scoped product 208 and implemented to meet compliance requirements.

Although Azure® offerings are discussed herein as examples, one of skill will understand that the teachings presented here may be ported, adapted, or otherwise applied to offerings in other environments and to offerings from vendors other than Microsoft Corporation.

In one architecture, a notebooks component 402 includes or uses two parts: a front end 202 and a back end 214. These parts are tightly integrated and work together to deliver the notebooks experience. In some cases, the front end 202 includes a TypeScript™ bundle that runs in a browser 602, and the back end 214 includes a set of microservices 216 (mark of Microsoft Corporation). In some implementations, the front end 202 makes REST & WebSocket calls to the service back end 214.

At a high level, there are at least two architectures that enable this communication: a direct connection architecture 400 (to be used with particular caution) and a proxy architecture 500 (recommended, e.g., for all products that are hosting Azure® notebooks, whether they are Azure® services or standalone products).

With the direct connection architecture 400, the notebooks component in the browser calls the back end directly. The host creates an Azure® notebooks resource 836 (or a counterpart resource 836 in other environments) per parent host resource.

With the proxy architecture 500, the browser communicates only with a host product back end 404 which proxies the calls to the notebooks back end 214. This architecture encapsulates the existence of the notebooks service back end, hiding it from the end customer 104, simplifying the concepts exposed to the service provider customer, and also simplifies implementation for the host. For example, with the proxy architecture there is only one set of private links for the customer to configure. The proxy pattern gives the host more flexibility and control to meet performance or other criteria in the way that customers want them to be met, e.g., as to policy, auditing, access control, network configuration, etc.

From an engineering perspective, while additional work is needed to implement the proxy in the host service under the proxy architecture, there may be less work elsewhere, such as Azure® Resource Provider control plane work or counterpart work in non-Azure® environments. For example, depending on the host's architecture, hosts could choose to use a single notebook resource for all tenants in the region thereby reducing the engineering work to create and manage notebook resources. Also, the host does not need to wire up and expose two sets of private link configurations in the Azure® Portal or its counterpart, when the proxy architecture is chosen. In general, the proxy is fully implemented by the host. The proxy may be implemented with wildcard route matching so that changes in APIs and the addition of new routes can be automatically handled without servicing the proxy component.

In summary, one may view the two architectures as follows.

The direct connection architecture 400 involves policy and audit over two API routes, disjoint access control and monitoring, two sets of private links terminating on different services for full VNet isolation, possible difficulty configuring firewall or other network security rules, and full control plane integration to provision notebook component resources. This architecture 400 may be deemed acceptable if there are no advanced requirements (e.g., as to firewall, security, etc.), and it may be a good choice for SaaS scenarios.

The proxy architecture 500 involves policy and audit over one route, central access control and monitoring, only one set of private links for VNet, firewall rules configured centrally, build out provisioning of resources, and proxy implementation in the host. This architecture 500 may deliver enterprise promises with customer simplicity. In some scenarios, architecture 500 is deemed superior to architecture 400, although both deliver enterprise promises, because in architecture 500 there is only one private link (a.k.a., plink) route to be audited. Architecture 500 may thus be suitable to enterprises which have more stringent requirements than the enterprises that use architecture 400.

As to Azure® notebook resources, in some implementations host products, or a host product's build-out pipeline, first create one or many notebook resources in order to host the notebooks component. An Azure® notebook component resource, for instance, may deliver access keys to enable the component to call the notebook back end service. The notebooks resource also exposes mechanisms to create and associate private links for virtual network (VNet) 406 isolation of the notebooks back end service, should it be desired by a host. Additionally, in some implementations a notebooks component resource provides an identity for each host product so that a vendor notebooks team can compliantly collect business metrics and drive continuous improvements in product quality.

Some implementations may proceed as follows. A request is sent to have the product hostname and AppID (or counterpart application ID) added to an inclusion list by a notebooks team. The same product hostname is also provided as the hostname when creating a notebooks resource. In the host product's deployment pipeline, added scripts request creation of notebooks component resources. These scripts may be templated to create a unique resource per deployed region. A ResourceID (or counterpart resource ID) returned by the scripts may be placed into the host product's data plane for storage and retrieval at data plane run time. When storing the resource ID, it may be tagged with the region that it is intended to be used in. At host product run time (data plane), the host product's service back end may retrieve the resource ID for the notebooks resource associated with the region in which the service is running. The host product's service back end can then call a validate API in the notebooks back end service using the retrieved resource ID and resource key to retrieve an API access token. The host product's service back end can then pass the API access token down to the host product's client (e.g., browser) implementation. In a host product's front end 412 (e.g., browser) implementation the access token and refresh token can then be used to make calls to the notebooks component API when initializing the component.

As to a resource model for the direct connection architecture, a host product consuming the notebooks component may create one unique notebook resource for each host product resource. A unique notebooks resource may be created by the host product's resource provider when it creates the unique resource that represents an instance of the host product for the customer. The host product resource may be registered as a parent resource of the associated notebooks resource. A unique notebook resource per parent resource may allow isolation to that customer of configuration information such as private links.

As to choosing the right parent resource, some products create multiple resource types. If a host product falls into this category, while customers will not see these non-tracked, hidden resources it may be important that they are created at the right granularity and parented to the right host product resource or scenarios (e.g., private links) might break or not meet compliance requirements. If a product has any resource types that are multi-tenant, and has other child resources that are per tenant, one may choose the per tenant resource as the notebooks component parent resource. This helps ensure that organizational configurational information from each customer is isolated. If a product only has one multi-tenant resource, the proxy integration architecture may be better. If the host product supports private links, the resource that configures the private links may be the parent resource for the notebooks resource so that a private link to notebooks component back end service can also be configured.

In some implementations, one may add code to a host products resource provider (parent) to make REST calls requesting the creation of notebooks component resources. One may add code to the host product's resource provider (parent) to configure and enable private link as appropriate. One may store the resource ID and public DNS in the host service and use them to initialize the notebooks component at run time. At host product run time (data plane), the host product's service back end may retrieve the resource ID and public DNS that was stored by the control plane operations above for the notebooks resource associated with the host parent resource that is running. A resource key to use for this can be retrieved by calling the resource provider or counterpart using listCredentials or counterpart. The host product's service back end service may then make a call to the notebooks back end service using the retrieved resource ID and resource key to retrieve an API access token. The host product's service back end can then pass the API access token to the host product's client (browser) code. In the host product's front end 412 the access token and refresh token can then be used to make calls to the notebooks component API when initializing the component.

As a further example, a step of creating an Azure® notebooks resource may be accomplished in some implementations by a call along the following lines:

```
New-AzResource -ResourceType
"Contoso.Notebooks/NotebookProxies" -ResourceGroupName
$resourceGroupName -ResourceName $resourceName -Properties @{
hostname = "<host product's friendly name>"}
```

A step of getting the keys for an Azure® notebooks resource may be accomplished in some implementations by a call along the following lines:

```
POST
https://management.azure.com/subscriptions/{subscriptionId}/resourcegroups/
{resourceGroupName}/providers/Contoso.Notebooks/NotebookProxies/{resource
Name}/
listCredentials?api-version=preview1
```

A step of validating a resource key and getting an Azure® notebooks API access token may be accomplished in some implementations by a call along the following lines (this call is made from host product back end in order to not pass down the keys to the client):

```
POST https://<resource-url-returned-on-resource-
creation>/api/notebookresource/validate
{
  "resourceId": "123456789"
  "resourceKey": "Key1"
}
```

A call is then made to pass the access and refresh token to host client and initial notebooks component. This call may initialize the notebooks component using the access token and refresh token; these tokens are passed to the client's browser by the host product's back end service.

With regard to security, one of skill will recognize that notebooks are sometimes used for execution of arbitrary, customer-defined, code. Arbitrary code execution scenarios risk exposing customers to malicious code. Thus, it is contemplated that personnel responsible for hosts of notebooks components will think through their customer scenarios, use cases, attack vectors and potential threats, and ensure there are solid mitigations in place for each. Some mitigations to consider include the following. One is to host the notebooks component under a no value domain. Another is to put the whole notebook in an iframe and implement a post message proxy to communicate with the notebook component across the iframe boundary. This is complementary and can be combined with the no value domain mitigation. Another mitigation is to implement cross-site request forgery (XSRF) prevention wherever cookie auth is used and follow all the best practices for cookie auth.

FIG. 6 illustrates an implementation architecture in detail. A host management piece 606 gets notebook content from storage 408, gets compute information from a virtual machine 604 (compute node), and provides notebook content and compute details to a notebook 210. The notebook 210 sends notebook content to a Fetch Notebooks piece 608 and sends compute target information to compute connection piece 610. The compute connection piece 610 sends compute target or kernel information to an interactive computing environment piece 612, e.g., an Nteract™ component, which then uses it in communications to the compute node 604.

Additional support for the discussion above is provided below. For convenience, this additional support material appears under various headings. Nonetheless, it is all intended to be understood as an integrated and integral part of the present disclosure's discussion of the contemplated embodiments.

Technical Character

The technical character of embodiments described herein will be apparent to one of ordinary skill in the art, and will also be apparent in several ways to a wide range of attentive readers. Some embodiments address technical activities such as embedding 1006 a software component, communicating 902 between front end software and back end software, and creating 1004 digital resources, which are each an activity deeply rooted in computing technology. Some of the technical mechanisms discussed include, e.g., scripts 302, microservices 216, virtual machines 604, and kernels 220. Some of the technical effects discussed include, e.g., ease of installation and enhanced user interface consistency. Thus, purely mental processes and activities limited to pen-and-paper are clearly excluded. Other advantages based on the technical characteristics of the teachings will also be apparent to one of skill from the description provided.

Some embodiments described herein may be viewed by some people in a broader context. For instance, concepts such as compliance, performance, or security, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically and effectively integrate notebook access into host applications. Other configured storage media, systems, and processes involving compliance, performance, or security are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, operating environments, time period examples, software processes, security tools, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
GUID: globally unique identifier
HTTP(S): hypertext transfer protocol (secure)
IaaS or IAAS: infrastructure-as-a-service
ID: identification or identity
IoT: Internet of Things
IP: internet protocol
LAN: local area network
OS: operating system
PaaS or PAAS: platform-as-a-service
RAM: random access memory
ROM: read only memory
SIEM: security information and event management; also refers to tools which provide security information and event management
TCP: transmission control protocol
TLS: transport layer security
TPU: tensor processing unit
UDP: user datagram protocol
UEFI: Unified Extensible Firmware Interface
URI: uniform resource identifier
URL: uniform resource locator
VM: virtual machine
WAN: wide area network
Note Regarding Hyperlinks Portions of this disclosure contain URLs, hyperlinks, IP addresses, and/or other items which might be considered browser-executable codes. These items are included in the disclosure for their own sake to help describe some embodiments, rather than being included to reference the contents of the web sites or files that they identify. Applicants do not intend to have these URLs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Some Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, "risk" refers to a potential for loss or harm. "Risk" may also be defined as a likelihood of loss or harm multiplied by the impact if the loss or harm actually occurs.

A "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

An "administrator" (or "admin") is any user that has legitimate access (directly or indirectly) to multiple accounts of other users by using their own account's credentials. Some examples of administrators include network administrators, system administrators, domain administrators, privileged users, service provider personnel, and security infrastructure administrators.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Risk "mitigation" means performing one or more of the following in conjunction with, or as a precondition of, or in response to, a request or other attempt to access an asset or other resource: alerting, altering, auditing, authenticating, authorizing, blocking, delaying, invoking a security control, limiting, managing, moving, logging, reconfiguring, reporting, restricting, securing, or another operation taught herein. Mitigation is performed computationally, e.g., not by operation of law or by persuasive oratory.

"Misuse" of an asset or other resource includes any improper or unauthorized use, including in particular any uses that violate the confidentiality, integrity, availability, or privacy of data.

"Secured" means only that some security is provided, not that the effectiveness of the security is guaranteed.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Notebook access operations such as establishing private links, creating resources, running scripts, and many other operations discussed herein, are understood to be inherently digital. A human mind cannot interface directly with a CPU or other processor, or with RAM or other digital storage, to read and write the necessary data to perform the notebook access steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as communicating, connecting, converting, creating, embedding, initializing, providing, receiving, routing, running, sending, transitioning, using, utilizing (and communicates, communicated, connects, connected, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium (a device), not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as a "computational system" or "computing system", and when in a network may be referred to as a "node"
104 users, e.g., user of an enhanced system 400
106 peripherals
108 network generally, including, e.g., LANs, WANs, software-defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or nonvolatile or both)
118 data (digital)
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on
124 applications, e.g., word processors, web browsers, spreadsheets, games, email tools, commands
126 display screens, also referred to as "displays"
128 computing hardware not otherwise associated with a reference number 106, 108, 110, 112, 114
200 enhanced environment; an example of an environment 100
202 notebook front end (software and other digital artifacts)
204 notebook user interface (software and other digital artifacts)
206 host application user interface
208 host application; an example of an application 124
210 notebook, e.g., JSON document containing an ordered list of cells which can contain script code, markdown text, or rich media (e.g., HTML or JavaScript®-based interactive graphs) (mark of Oracle America, Inc.), for example; some examples of rich media used in notebooks are HTML or JavaScript®-based interactive graphs (mark of Oracle America, Inc.); many familiar software tools, open standards, and interactive programming services for notebooks are the results of Project Jupyter® efforts (mark of Num FOCUS, Inc.)
212 host system; an example of a system 102
214 notebook back end (software and other digital artifacts)

216 notebook microservices (software and other digital artifacts)
218 compute node (software and other digital artifacts, with supporting hardware)
220 notebook kernel (software and other digital artifacts); an example of a kernel 120
302 user interface script (software and other digital artifacts)
304 notebook content viewing (activity), also refers to software and other digital artifacts specifically designed to support such viewing
306 notebook content editing (activity), also refers to software and other digital artifacts specifically designed to support such editing
308 notebook content executing (activity), also refers to software and other digital artifacts specifically designed to support such executing
310 notebook component bundle (software and other digital artifacts)
312 notebook user experience structure portion of bundle 310
314 notebook user experience appearance portion of bundle 310
316 notebook user experience behavior portion of bundle 310
318 interface generally
320 aesthetic of user interface or user experience or both
400 direct connection architecture
402 notebook software component (software and other digital artifacts)
404 host product back end (software and other digital artifacts)
406 virtual network (software and other digital artifacts)
408 storage, e.g., storage node, storage resource (software and other digital artifacts, with supporting hardware)
410 compute, e.g., compute node, compute resource such as virtual machine (software and other digital artifacts, with supporting hardware)
412 host application front end (software and other digital artifacts)
500 proxy architecture
502 proxy (software and other digital artifacts)
602 web browser
604 virtual machine
606 host management piece (software and other digital artifacts)
608 FetchNotebooks piece (software and other digital artifacts)
610 compute connection piece (software and other digital artifacts)
612 interactive computing environment piece (software and other digital artifacts)
702 integrated development environment (software and other digital artifacts)
704 cloud, cloud computing environment, cloud environment (software and other digital artifacts, with supporting hardware)
706 repository environment, e.g., repository software and other digital artifacts provided or created or managed under the marks GitHub® (mark of GitHub, Inc.), BitBucket® (mark of Atlassian Pty Ltd), or SourceForge® (mark of SourceForge Media, LLC), to name just a few examples
708 machine learning platform, e.g., Azure® Machine Learning (software and other digital artifacts, with supporting hardware)
710 cloud computing laboratory, e.g., Azure® Lab Services (software and other digital artifacts, with supporting hardware)
712 video gaming environment (software and other digital artifacts, with supporting hardware)
800 aspect of notebook access
802 reference to a software component, e.g., pointer, URL, GUID, or other component identifier
804 computational, networking, or other digital messaging protocol
806 message passing digital communications protocol or architecture or mechanism
808 tunneling digital communications protocol or architecture or mechanism
810 brokering digital communications protocol or architecture or mechanism
812 proxying digital communications protocol or architecture or mechanism
814 autocompletion information or service; some examples of autocompletion services include Microsoft Intellisense® and IntelliCode™ services (marks of Microsoft Corporation); autocompletion may be supported by service code that analyzes the notebook being edited as well as related files; the autocompletion analysis may include static analysis of files that are not currently open for editing, or not currently running inside a notebook kernel, or lack a current runtime environment; autocompletion may be provided in read-write (edit) mode or in execute mode, but would not be sensible for a read-only mode; some embodiments include a hovering functionality so that when a user hovers a mouse pointer over a method, a tooltip describes the method's characteristics such as parameters, return values, error codes, etc.
816 top-level domain name
818 cell of a notebook 210
820 frame; a frame can be defined using an <iframe> HTML tag, or a legacy <frame> HTML tag, or a Google <portal> tag, for example
822 event-driven API; in some embodiments for explicit actions that the component takes on user interaction or host API calls, e.g., launching a new kernel or restarting the kernel, the component will raise an event to signify the start of the operation and the end of the operation for the hosting front ends to react to the actions; similarly, when there is any error in the system that needs to be raised to the host, an embodiment may raise a document error that hosts can subscribe and react to
824 hook; some embodiments support hooks that allows hosts to hook into an action sequence as the embodiment takes that action; using launch as an example, when a user executes on a cell, the embodiment connects to the compute and launches a kernel; for use during this operation, the embodiment provides two hooks to allow users to either terminate the action sequence, delay, or prepare their operations before the embodiment completes the sequence, either before the compute was connected to in case the host needs to start the compute before the embodiment connects, or after a kernel launch but before the embodiment executes the cells to allow hosts to finish prepping the kernel further
826 callback; in some scenarios an embodiment provides a callback for use during saving, to allow hosts to do their own saving operation when a content save is called on the notebook
828 notebook content; an example of data 118
830 HTML (hypertext markup language) format 832 notebook content editor (software and other digital artifacts)
834 pointer, e.g., address or link
836 notebook resource (digital artifact)
838 notebook content format conversion service (software and other digital artifacts)
840 notebook hub service (software and other digital artifacts)
900 flowchart; 900 also refers to notebook access methods illustrated by or consistent with the FIG. 9 flowchart
902 communicate digitally between a front end and a back end
904 provide a user interface of an embedded notebook component; performed computationally
1000 flowchart; 1000 also refers to notebook access methods illustrated by or consistent with the FIG. 10 flowchart
1002 receive a reference to a notebook component; performed computationally
1004 create a digital resource for use by or on behalf of a notebook component; performed computationally
1006 embed a reference in an application on a host machine; performed computationally
1100 flowchart; 1100 also refers to notebook access methods illustrated by or consistent with the FIG. 10 flowchart (which encompasses FIGS. 8 and 9)
1102 computationally initialize a notebook component
1104 computationally use a Jupyter® messaging protocol
1106 computationally provide aesthetically consistent notebook user interfaces across different kinds of host applications
1108 avoid computational reliance on a specified mechanism
1110 computationally receive autocompletion information, e.g., what to complete, options for completing it, completion choice made
1112 computationally transition between content formats
1114 computationally swap in an editor, e.g., load or launch the editor for use
1116 computationally route notebook outputs to a location specified by a particular domain name
1118 computationally send notebook cell outputs to a specified frame
1120 computationally provision a notebook kernel without expressly narrating that act to an end user
1122 computationally receive a request
1124 request (digital artifact or computational action)
1126 computationally convert content format
1128 run (computationally execute) a particular service
1130 computationally communicate with a notebook hub service
1132 computationally utilize host storage
1134 computationally utilize cloud storage
1136 computationally provide a front end tailoring mechanism, e.g., event-driven API, hook, or callback
1138 computationally and operably connect a resource to a notebook
1140 any step discussed in the present disclosure that has not been assigned some other reference numeral

CONCLUSION

In short, the teachings herein provide a variety of notebook access functionalities which operate in enhanced systems 200 or 212 or both. Some embodiments support embedding 1006 of a notebooks software component 402 in a surrounding host application 208, thereby promoting consistency of notebook user interfaces 204 and user experiences between different kinds of applications 208. For instance, the notebook access added to an integrated development environment (IDE) 702 may be aesthetically consistent 320 with the notebook access added to a business analytics tool 122 from the same vendor as the IDE. Departures from the aesthetic 320 are still supported, e.g., a notebook access provided in a video gaming environment 712 to teach gamers programming skills may have the same aesthetic 320 as the simulated world of the video game 714, rather than an IDE 702 aesthetic or an enterprise software aesthetic. Direct integration 400 or proxied integration 500 architectures may be used. Efficiencies may be gained by distinguishing between notebook viewing 304, editing 306, and executing 308 operations, and providing more computationally expensive resources only as needed for the notebook access being performed.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into SIEM software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 9 through 11 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured for notebook operations, the system comprising:
   a digital memory;
   a first host application which is not a web browser and which resides at least partially in the digital memory and has a first host application user interface, a first instance of a notebook user interface being embedded in the first host application user interface, the notebook user interface comprising a notebook front end which is configured to upon execution communicate with a notebook back end, the notebook user interface configured to upon execution perform at least notebook viewing and notebook editing operations;
   a second host application which is not a web browser and which resides at least partially in the digital memory and has a second host application user interface, a second instance of the notebook user interface being embedded in the second host application user interface, the second host application user interface being aesthetically inconsistent with the first host application user interface; and
   a processor in operable communication with the digital memory, the processor configured to execute the first host application, the processor also configured to execute the second host application;

the system configured to provide, via the embedded instances of the notebook user interface, a consistent notebook experience across different host applications.

2. The system of claim 1, further characterized by having one of the following integration architectures:
a direct connection architecture wherein the notebook front end calls the notebook back end directly; or
a proxy architecture wherein the notebook front end calls a proxy which in turn calls the notebook back end.

3. The system of claim 1, wherein each instance of the notebook user interface includes or references an embeddable bundle, the embeddable bundle including:
an HTML portion which defines at least a notebook user experience structure;
a CSS portion which defines at least a notebook user experience appearance; and
a JavaScript portion which defines at least a notebook user experience behavior.

4. The system of claim 1, wherein the system is configured to perform notebook execution operations, and the system further comprises:
a compute node in operable communication with the notebook back end; and
a notebook kernel executing on the compute node or configured for execution on the compute node.

5. The system of claim 1, comprising the notebook back end, wherein the notebook back end comprises autocompletion code.

6. The system of claim 1, wherein at least one of the host applications includes or resides within at least one of the following:
an integrated development environment;
a cloud hosted repository environment;
a machine learning platform;
an educational cloud computing laboratory; or
a video gaming environment.

7. A method for supporting notebook usage, the method comprising:
receiving a reference to a notebook software component, the notebook software component including an embeddable bundle, the embeddable bundle comprising a first portion which defines at least a notebook user experience structure in a markup language or a markdown language or both, a second portion which defines at least a notebook user experience appearance, and a third portion which includes a script which at least partially defines a notebook user experience behavior;
embedding the reference in a first host application on a host machine, thereby configuring the host machine to provide, via the embeddable bundle, a first instance of a notebook user interface; and
embedding the reference in a second host application on the host machine, thereby configuring the host machine to provide, via the embeddable bundle, a second instance of the notebook user interface.

8. The method of claim 7, comprising embedding the reference in each of at least three kinds of host application, thereby providing a consistent notebook user interface across different kinds of host application, where the kinds of host application are selected from the following: integrated development environment applications, repository environment applications, machine learning platform applications, educational cloud computing laboratory applications, video gaming environment applications.

9. The method of claim 8, further characterized in that an embedded notebook XN has a user interface XNUI that is aesthetically consistent with a respective host application user interface XHAUI, and an embedded notebook YN has a user interface YNUI that is not aesthetically consistent with a respective host application user interface YHAUI.

10. The method of claim 7, further comprising initializing the notebook software component by providing a pointer to a notebook to be rendered.

11. The method of claim 10, further comprising communicating under a Jupyter messaging protocol between a notebook kernel and the notebook user interface.

12. The method of claim 10, further comprising avoiding relying on any of the following for transmitting or securing communications between at least one host machine notebook user interface instance and a notebook kernel: message passing, tunneling, brokering, or proxying.

13. The method of claim 10, further comprising receiving autocompletion information at the host machine via the notebook software component.

14. The method of claim 10, further comprising at least one of the following:
routing notebook outputs to a top-level domain other than a domain that is being used by the host application; or
sending outputs of all cells of a notebook to a frame.

15. The method of claim 10, further comprising providing at least one of the following for interaction with the notebook user interface:
an event-driven API;
a hook; or
a callback.

16. The method of claim 10, further comprising at least one of the following:
transitioning a notebook content from an HTML format to an editable text format and transparently swapping in an editor in response to receiving a user request to edit the notebook content; or
transparently provisioning a notebook kernel in response to receiving a user request to execute the notebook content.

17. A computer-readable storage device configured with data and instructions which upon execution by a processor cause a system to perform a method for supporting notebook usage, the method comprising:
obtaining a pointer to a notebook file which specifies a notebook;
creating a notebook resource on a host machine, the host machine configured to provide, via embedded instances of a notebook user interface, a consistent notebook experience across different host applications, each embedded instance comprising a notebook software component including an embeddable bundle, the embeddable bundle comprising a first portion which defines at least a notebook user experience structure in a markup language or a markdown language or both, a second portion which defines at least a notebook user experience appearance, and a third portion which includes a script which at least partially defines a notebook user experience behavior;
connecting the notebook resource to the notebook; and
transitioning a notebook content from an HTML format to an editable text format and transparently swapping in an editor in response to receiving a user request to edit the notebook content.

18. The storage device of claim 17, wherein the method further comprises performing at least one of the following via a notebook back end service:
converting a notebook content between at least two of the following: an HTML format, a PDF format, a LaTeX format, or an executable script format; or running a Python format conversion service on the notebook content.

19. The storage device of claim 17, wherein the method further comprises communicating with a multi-user notebook hub service to spawn, proxy, or otherwise manage multiple instances of a single-user notebook server.

20. The storage device of claim 17, wherein the method further comprises at least one of the following:
- utilizing a host machine storage device for holding a notebook content during execution of the notebook content while avoiding use of cloud storage of the notebook content; or
- utilizing cloud storage of the notebook content during execution of the notebook content.

* * * * *